United States Patent [19]

Mens et al.

[11] Patent Number: 4,558,837

[45] Date of Patent: Dec. 17, 1985

[54] SKID LANDING GEAR PROVIDED WITH COMPONENTS HAVING A DEVICE FOR ABSORBING ENERGY BY PLASTIC DEFORMATION AND/OR FOR LIMITING STRESS, AND COMPONENTS OF THIS TYPE

[75] Inventors: Jacques M. N. Mens, Marignane; Pierre Barnoin, Eguilles; Michel J. L. Martin, Sausset-Les-Pin, all of France

[73] Assignee: Societe Nationale Industrielle et Aerospatiale, Paris, France

[21] Appl. No.: 559,549

[22] Filed: Dec. 8, 1983

[30] Foreign Application Priority Data

Dec. 8, 1982 [FR] France ............... 82 20549

[51] Int. Cl.[4] .............................................. B64C 27/33
[52] U.S. Cl. .................... 244/108; 244/104 R; 244/104 FP
[58] Field of Search ........... 244/100 R, 102 R, 104 R, 244/104 FP, 104 CS, 17.17, 108, 138 R; 188/376, 374, 371

[56] References Cited

U.S. PATENT DOCUMENTS

| 2,933,270 | 4/1960 | Maltby | 244/17.17 |
|---|---|---|---|
| 3,042,345 | 7/1962 | Holland, Jr. | 244/17.17 |
| 3,144,223 | 8/1964 | Nichols | 244/17.17 |
| 3,173,632 | 3/1965 | Woods | 244/17.17 |
| 3,181,821 | 5/1965 | Webb | 188/371 |
| 3,387,802 | 6/1968 | Cruz | 244/17.17 |
| 3,538,785 | 11/1970 | Grancon | 188/371 |
| 3,716,208 | 2/1973 | Fagan et al. | 244/108 |
| 3,800,896 | 4/1974 | Albertson | 244/108 |
| 3,862,669 | 1/1975 | Lindbert et al. | 188/376 |
| 3,997,133 | 12/1976 | Fagan | 244/104 R |

FOREIGN PATENT DOCUMENTS

| 943917 | 3/1949 | France | 244/108 |
|---|---|---|---|
| 1578594 | 8/1968 | France . | |
| 2346216 | 7/1976 | France . | |
| 2425584 | 5/1979 | France . | |

Primary Examiner—Galen L. Barefoot
Attorney, Agent, or Firm—Armstrong, Nikaido, Marmelstein & Kubovcik

[57] ABSTRACT

Skid landing gear provided with components having a device for absorbing energy by plastic deformation and/or for limiting stress, and components of this type.

According to the invention, each of two undercarriage parts comprises a skid 170 connected to the structure to two crosspieces 175 and 176 that are hinged on the structure about an axis parallel to the hinge axis on the structure of the other crosspiece of the same undercarriage part, and at least one component 181 that has a main mechanical and/or hydraulic function, such as a strut, a cross-bracing or control jack, a shock absorber or a shock absorber jack, the component being provided with a device for absorbing energy by plastic deformation and/or for limiting stress, and is connected on the one hand to a crosspiece 176 of the respective undercarriage part and on the other hand either to the corresponding skid 170 or to the structure of the aerodyne.

The invention is especially suited to use on helicopters.

8 Claims, 22 Drawing Figures

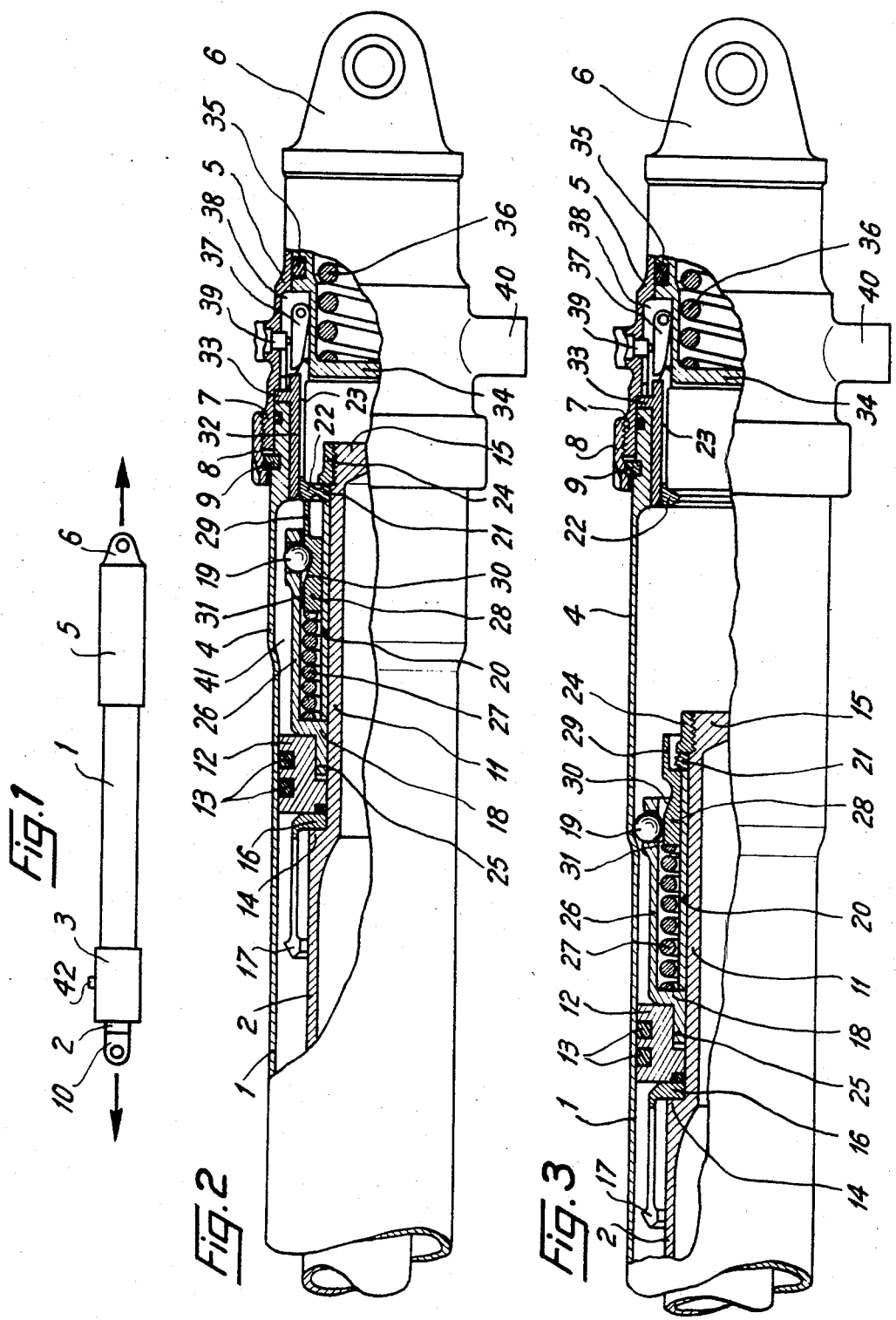

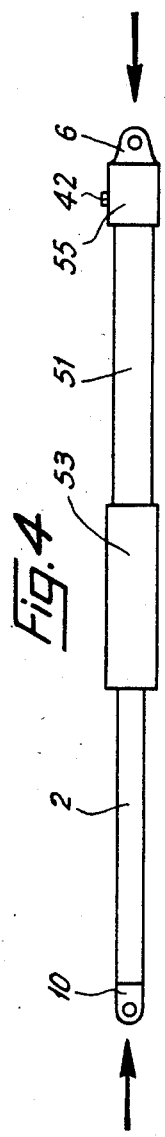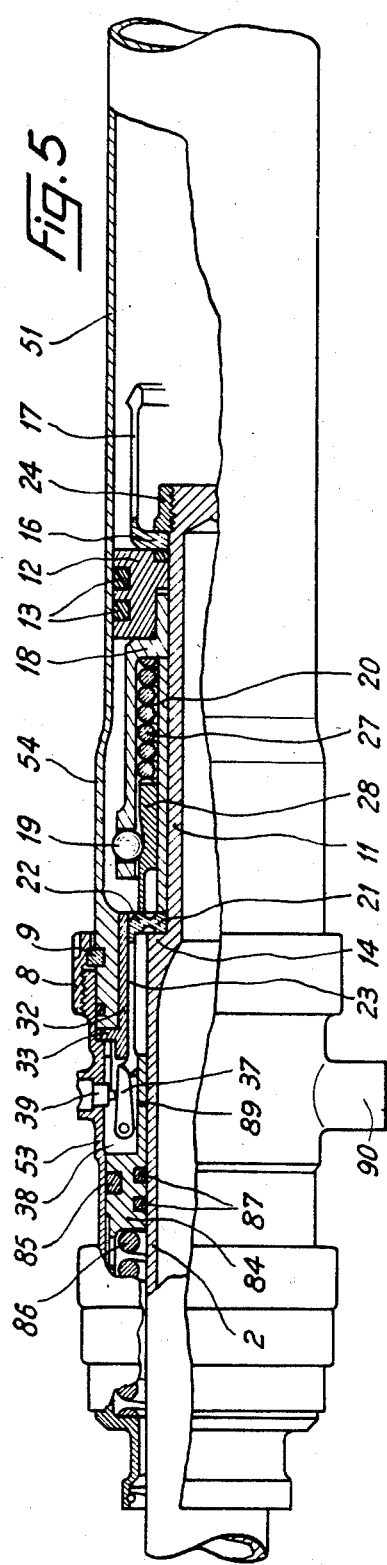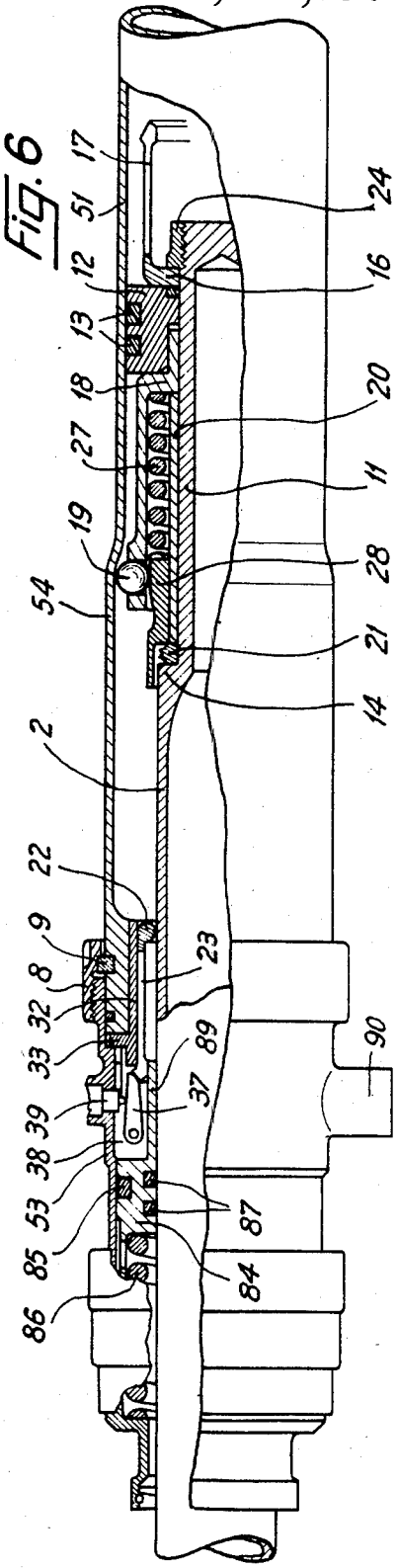

U.S. Patent Dec. 17, 1985 Sheet 3 of 9 4,558,837
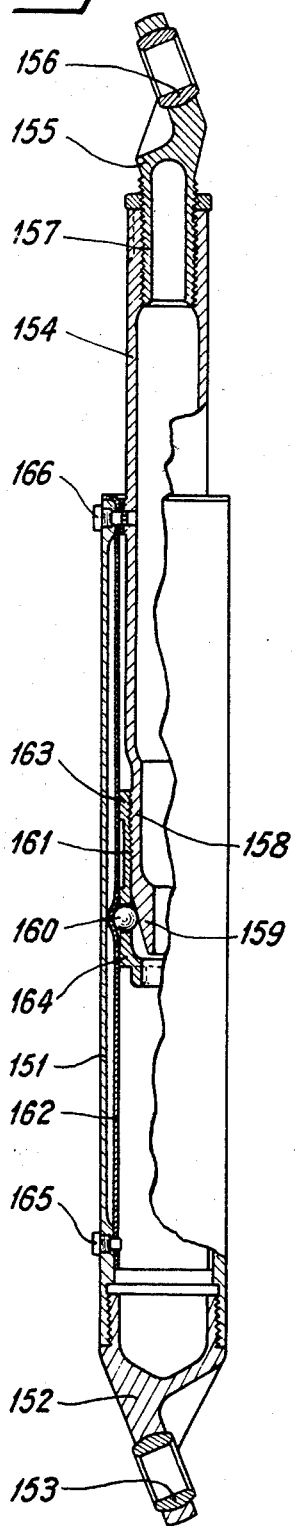
Fig. 7
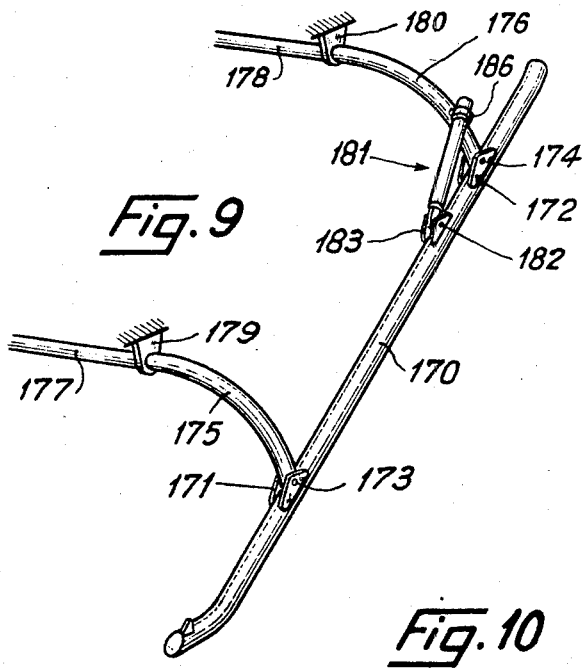
Fig. 9
Fig. 8
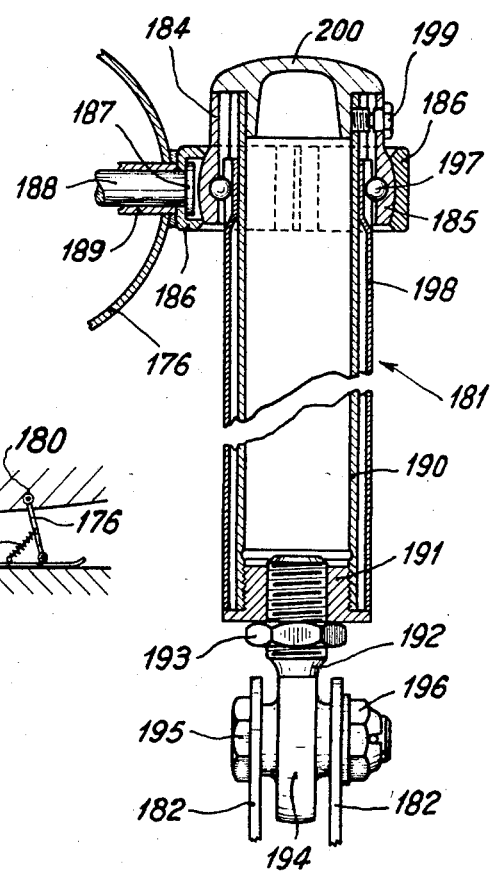
Fig. 10

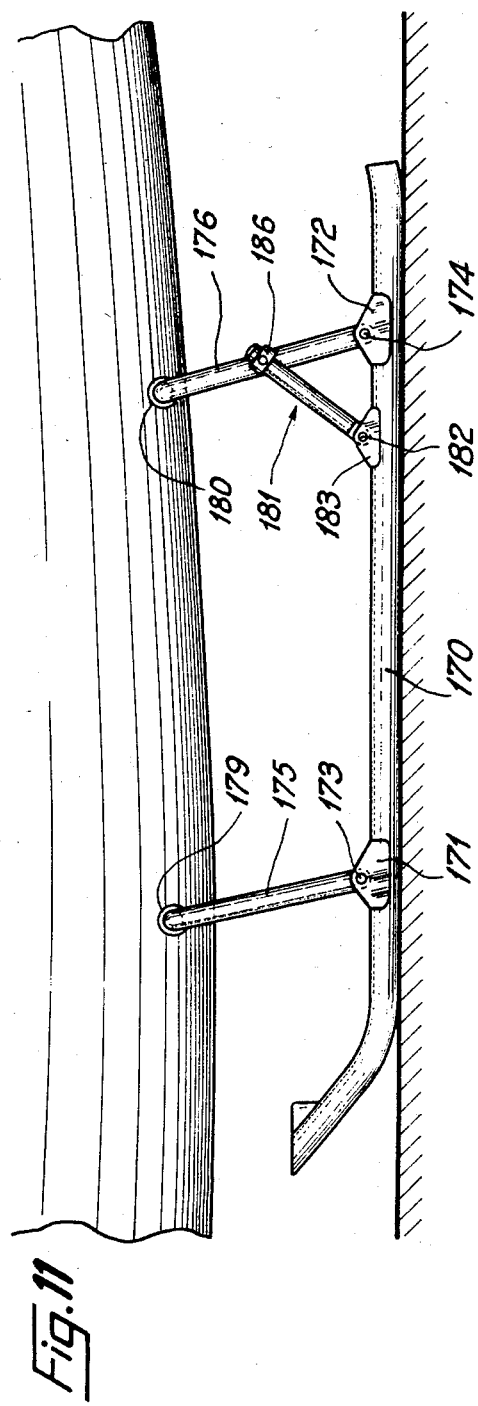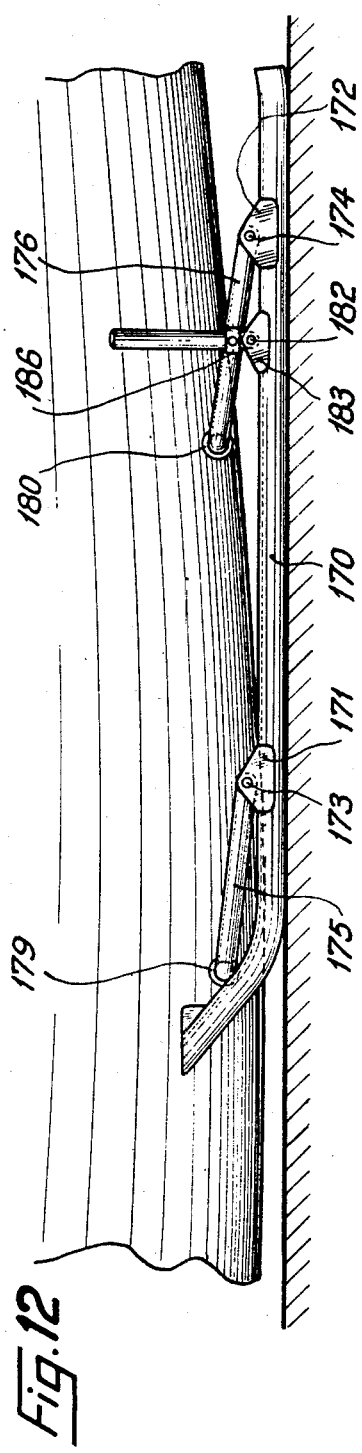

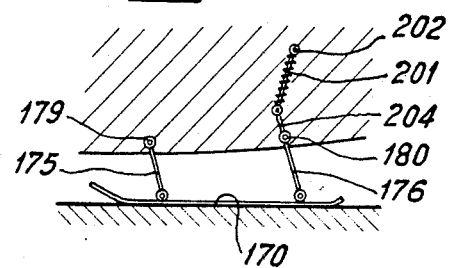
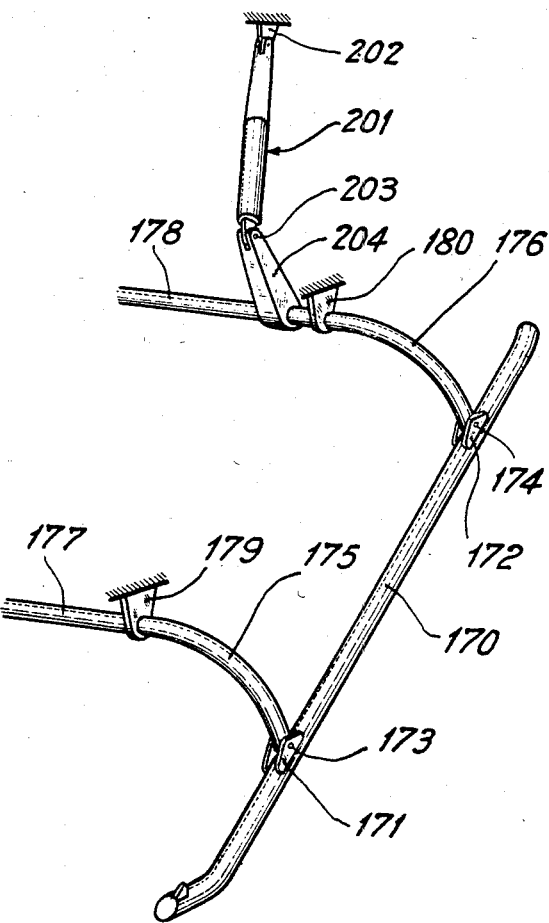
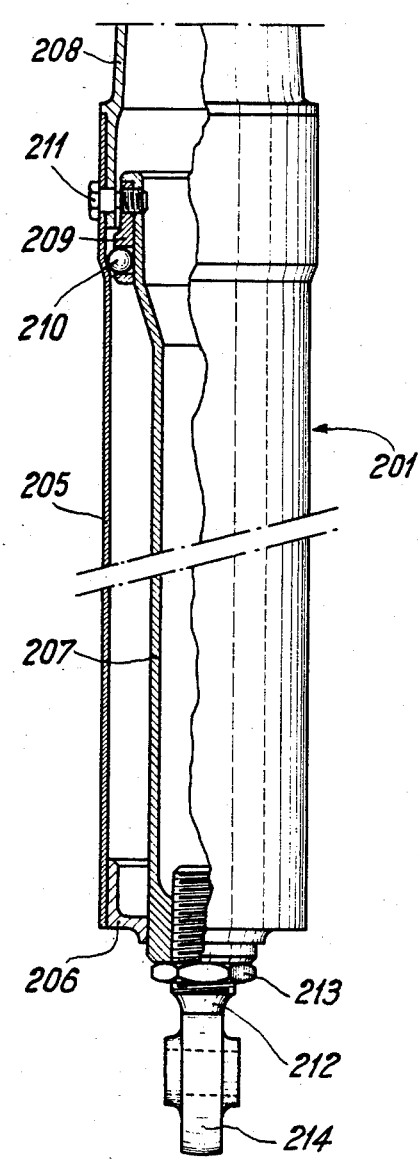

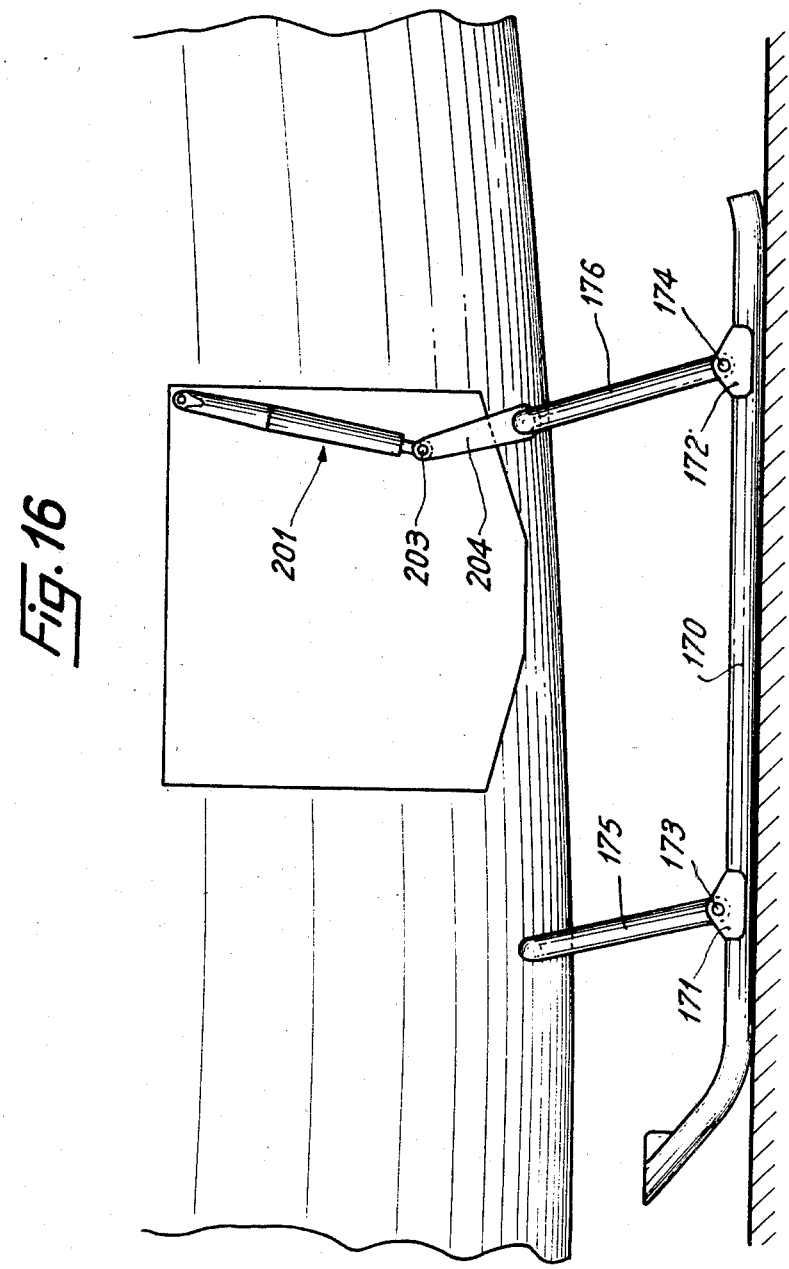

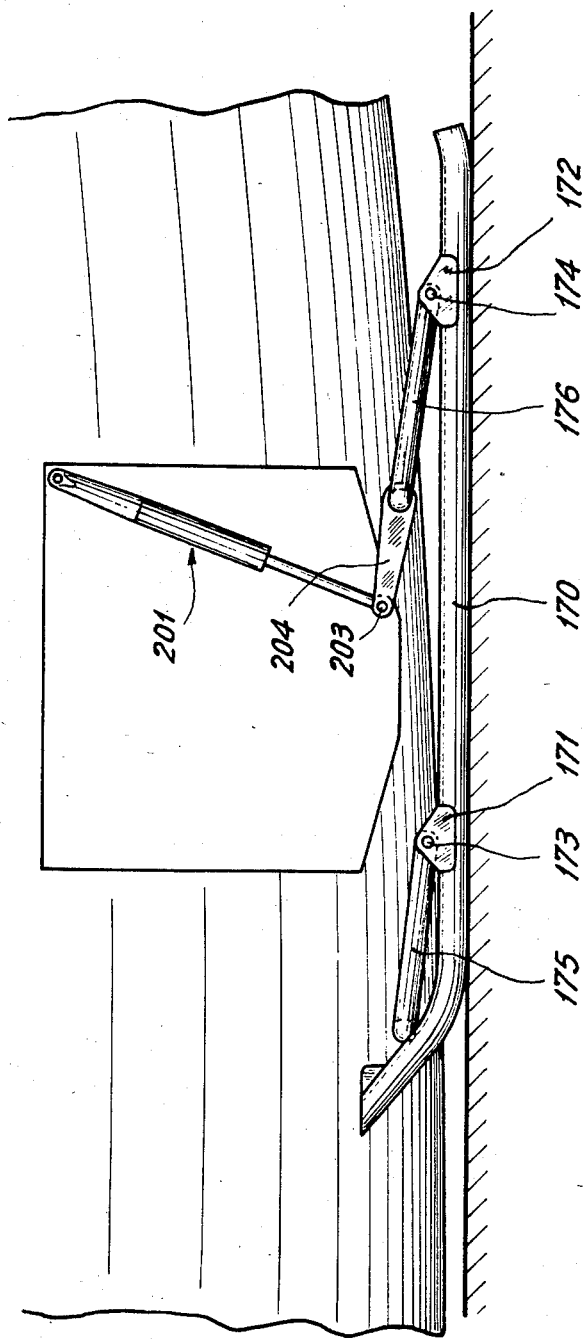

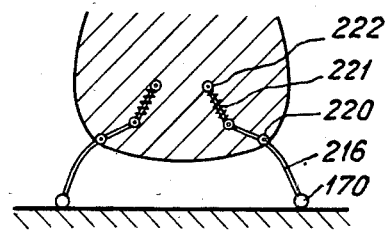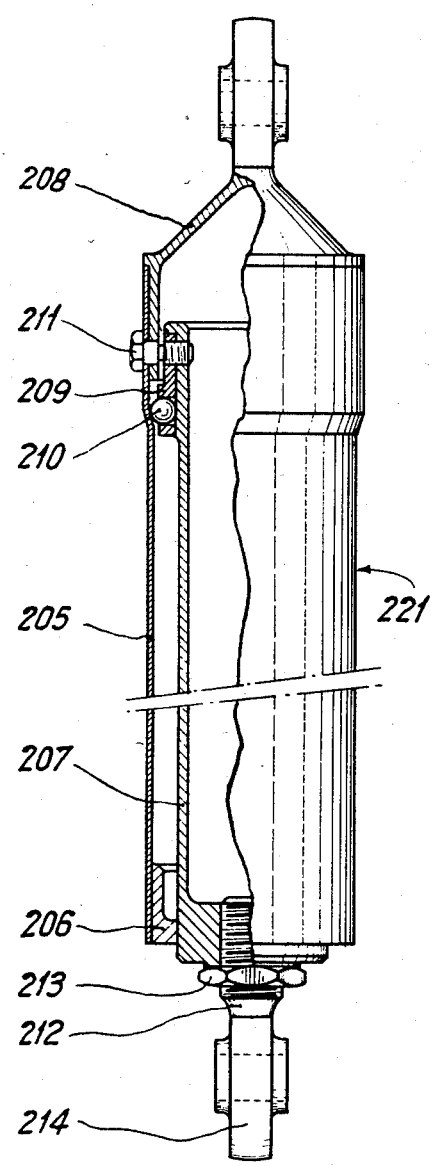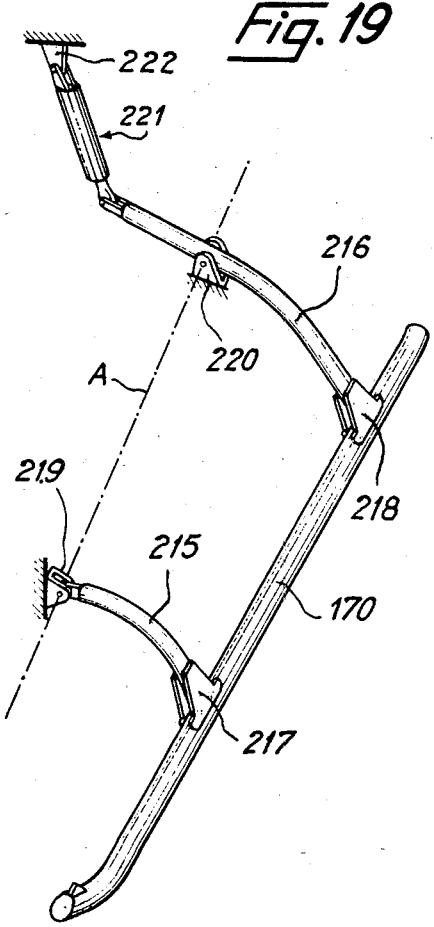

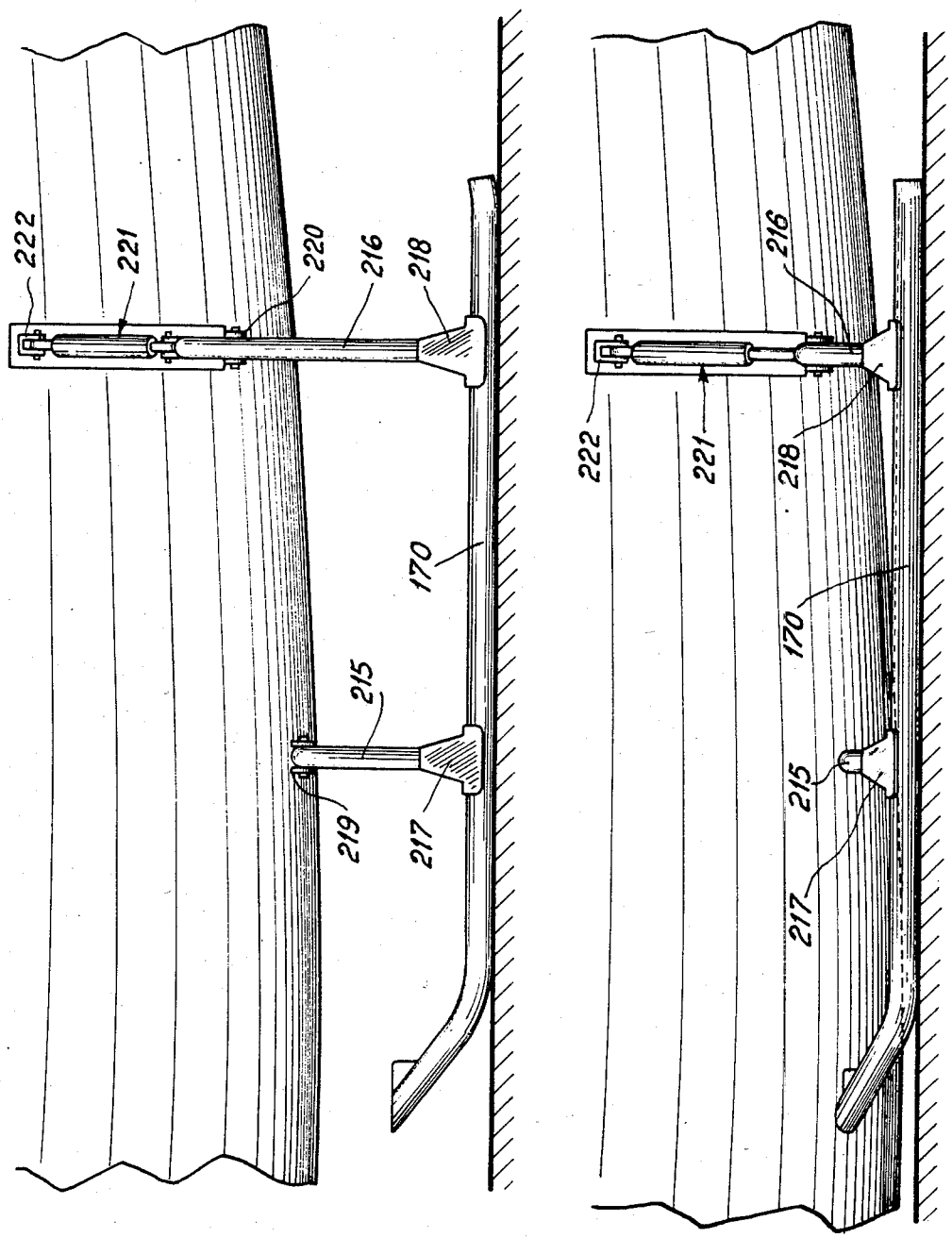

SKID LANDING GEAR PROVIDED WITH COMPONENTS HAVING A DEVICE FOR ABSORBING ENERGY BY PLASTIC DEFORMATION AND/OR FOR LIMITING STRESS, AND COMPONENTS OF THIS TYPE

The present invention relates to skid landing gear provided with components having a device for absorbing energy by plastic deformation and/or for limiting stress, and to components of this type.

The invention relates more especially to skid landing gear which is to be fitted to helicopters and comprises mechanical components, such as struts, and, optionally, also hydraulic components, such as jacks, shock absorbers and shock absorber jacks, adapted especially so as to have a capacity commonly designated by the term "anti-crash".

There are already known from French Pat. No. 1 549 884 and its certificate of addition No. 2 010 302 devices for absorbing energy by plastic deformation and for limiting stress which comprise rolling elements, such as balls or rollers, arranged between two telescopic members in such a manner that in the case of a shock causing telescopic displacement of the two members the rolling elements cause a progressive plastic deformation of at least one of the two telescopic members owing to the fact that the rolling elements are squeezed between the telescopic elements and are manufactured from a material that is harder than the material forming at least the member which deforms and in which the rolling elements form grooves.

According to the above-mentioned certificate of addition, the rolling elements are maintained in predetermined positions in perforations made in a sleeve which is mounted coaxially between the telescopic members, has a generally cylindrical shape and is arranged so that it moves together with these rolling elements and maintains a predetermined spacing between them during their rolling movement resulting from a relative displacement of the telescopic members, so that this sleeve acts as a cage for the rolling elements.

In these devices, the mounting of the rolling elements squeezed between the telescopic members is selected so as to compress these rolling elements between the portions, which are very frequently cylindrical portions, of the telescopic members in such a manner that in the area of contact with the telescopic members these rolling elements exert an average contact pressure having a value that is greater than the deformation contact pressure for the material forming at least the deformable telescopic member, that is to say greater than the pressure at which stresses giving rise to plastic deformation are distributed in the area of contact, this plastic deformation producing an elevated and localised dissipation of energy.

The amount of energy dissipated per unit displacement of the telescopic members depends on the degree or depth of the plastic deformation which, itself, depends on the load on the rolling elements, that is to say depends on their number and on their degree of squeezing which is defined by the amount by which the radial dimension or diameter of the rolling elements is greater than the difference between the external radial dimensions or radii and the internal radial dimensions or radii of the telescopic members in the area of contact having deformation. This value for the dissipation of energy depends also on the relative hardnesses of the materials forming the rolling elements and the telescopic members.

The use of such devices gives energy absorption characteristics that can be predicted with great accuracy. For example, a constant absorption can be obtained along the whole travel of the telescopic members if the thickness of the latter and the degree of squeezing are kept constant. It is also possible to manufacture one, or even two, of the telescopic members with an internal or external dimension that varies in a continuous manner so as to obtain a converging or diverging article, for example such that the rolling elements encounter a resistance that increases or decreases, respectively, with telescopic displacement of the members. In the same manner, the thickness of the wall of one of the two members may vary along the whole of the latter so as to give a variable resistance to the plastic deformation.

In the above-mentioned patents and in British Pat. No. 1 195 445 and in French Pat. No. 2 085 498, which describe analogous devices for absorbing energy, the devices are fitted on steering columns in vehicles, while an analogous device, which is the subject of German Pat. No. 2 918 179, is to be fitted to safety belts in vehicles.

It has already been proposed in French patent application No. 81 15 432, dated Aug. 10, 1981, in the name of the applicants, to fit mechanisms for absorbing energy by plastic deformation, such as those described in the patents mentioned above, to components the main function of which is hydraulic and/or mechanical, such as a control and/or cross-bracing jack or an oleopneumatic shock absorber which, itself, already forms a device for absorbing and dissipating energy, or a cross-bracing strut for a main member, so that these components are able to fulfil an additional function of absorbing energy and/or limiting stress with the aim of safety and protection of the structure with which they are associated and which has parts to which violent stresses resulting from shock and jerks to the structure should not be transmitted without being damped, attenuated or limited.

This is the case for aerodynes the cells of which should, as far as possible, be protected in the case of accident in order to ensure, at the least, the survival of the passengers and also, if possible, the preservation of the main portion of the aerodyne, and just as in the application mentioned above, the aim of the invention is also to design landing gear for aerodynes, especially skid landing gear for helicopters, having components according to the above-mentioned application or according to the present invention and having an "anti-crash" capacity.

For this purpose, a component according to the above-mentioned application, the main function of which is hydraulic and/or mechanical, such as a jack, shock absorber or strut, and which comprises a tubular element inside which is housed a telescopic element that is immobilised with respect to the tubular element in at least one position for use by a least one locking device, comprises also a device for absorbing energy by plastic deformation and/or for limiting stress, which device comprises an arrangement of rolling elements held in position by a cage and interposed with squeezing between two members that are capable of sliding one into the other after rupture of a breakable element having a predetermined breaking strength in such a manner that the rolling elements bring about in a manner known per se, by plastic deformation of at least one of the two members, at a predetermined plastic deformation load, a dissipation of energy, the breakable element having a predetermined breaking strength being included in the locking device that immobilises the telescopic element in a position of use, which telescopic element forms the plastically non-deformable internal member of the device for absorbing energy inside the tubular element which is integral with the plastically deformable external member of the device for absorbing energy and the cage for the rolling elements being carried along by the telescopic element.

According to the above-mentioned application, the plastically deformable external member is formed either by the tubular element itself or by a sleeve which lines the inside of the tubular element over at least a part of its length with sufficient radial clearance to allow the plastic deformation caused by the rolling elements and is movable to allow the component to be repaired by replacing the sleeve and, at least, the breakable element.

According to the above-mentioned application, the tubular element can be formed by the body, which is generally cylindrical in shape, of a strut that also comprises a rod which forms the telescopic element, is mounted in the body so that it can slide and is immobilised with respect to the body, in an initial position in which a portion of the rod lies inside the body, by means of at least one bolt having a partially screw-threaded shank screwed into a radial internal screw thread passing through the body at its end traversed by the rod and in such a manner that the end of the shank of the bolt penetrates a radial bore-hole in the rod of the strut and forms at the same time the locking device and the breakable element having a predetermined breaking strength, the cage retaining the rolling elements being integral with the exterior of the portion of the rod inside the body and the rolling elements being supported radially towards the inside against the rod and towards the outside in an indentation in the plastically deformable member formed either by the body or by the sleeve which is retained against the internal wall of the body at the end thereof that is traversed by the rod of the strut by the partially screw-threaded shank of the bolt(s).

Depending on whether the rod of the strut is rigidly connected to the body in the retracted position, semi-retracted position or extended position, the device for absorbing energy by plastic deformation of the strut may be used, in the case of stress that is greater than the rupture threshold of the breakable element, solely in tension, in tension or in compression, or solely in compression, respectively.

According to the above-mentioned application, the tubular element may also be formed by the cylinder of a hydraulic jack comprising a rod which forms the telescopic element, is mounted so that it can slide in the cylinder and is guided in the latter by a piston arranged at its end inside the cylinder, the rod of the jack being immobilised in the cylinder in at least one position for normal use of the jack by a locking device having resilient catches, the heads of which are locked against a step on the internal wall of the cylinder by at least one locking piston and the feet of which are integral with a radial projection forming the breakable element having a predetermined breaking strength which has an external collar separated by a rupture section from an internal collar which is carried along by the rod of the jack at the same time as the cage for the rolling elements arranged about the end of the rod inside the cylinder of the jack.

In a preferred embodiment of the jack according to the above-mentioned application, the rolling elements are retained radially towards the interior by a ring which is slidably mounted between the cage retaining the rolling elements and the rod of the jack, has, on its external face, a groove serving to accommodate the rolling elements in a position for use of the jack and is linked by an inclined ramp to a cylindrical portion, the ring being resiliently stressed towards the external collar of the breakable element such that, following the rupture of the latter, the rolling elements leave the groove and are moved onto the inclined ramp and then onto the cylindrical portion of the ring, in the case of relative displacement of the cage that carries the rolling elements and is carried along by the rod with respect to the ring which is maintained so that it abuts the external collar of the breakable element before being carried along with the rod by the internal collar of the breakable element in such a manner that the rolling elements are displaced radially towards the exterior, protruding with respect to the cage, and are capable of causing plastic deformation of the member having a predetermined plastic deformation strength.

According to the above-mentioned application and in the case where the plastically deformable member is the cylinder of the jack itself, a recess is provided, in the normal position of use of the jack, at the end of the cylinder containing the cage, the rolling elements and the ring, and this recess extends axially over a distance permitting the rolling elements to protrude with respect to the cage following the rupture of the breakable element and the initial displacement of the rod in the cylinder of the jack.

In the case where the desired absorption of energy results in dimensions of the cylinder of the jack that are incompatible with its normal operation, the cylinder may be lined by an internal deformable sleeve that is mounted with sufficient radial clearance to allow the deformation caused by the rolling elements.

Depending on whether the breakable element is associated with a locking device immobilising the rod in a retracted position with respect to the cylinder of the jack or with a locking device immobilising the rod in an extended position with regard to the cylinder of the jack, the device for absorbing energy by plastic deformation and/or for limiting stress in the jack is stressed in tension or compression, respectively, by a stress which may be smaller than, equal to or greater than the breaking threshold of the breakable element.

According to the above-mentioned application, the tubular element of the component may also be formed by the body, which has at least one portion that is generally cylindrical in shape, of a shock absorber which likewise comprises a cylinder which forms the telescopic element, is housed at least partially in the generally cylindrical portion of the body, is immobilised in a utilisation position in this body by at least one bolt that has a partially screw-threaded shank which passes through a radial bore-hole in the body and is screwed into a radial projection of the cylinder in such a manner as to form simultaneously the locking device and the breakable element, a shock absorber rod being slidably and sealingly mounted in the cylinder of the shock absorber which encloses additionally a resilient device for absorbing energy capable of returning the rod to its initial position in the cylinder and also a device for dissipating energy by extruding a volume of hydraulic oil displaced in the shock absorber by any relative displacement of the rod and the cylinder.

In a preferred embodiment, the external radial projection into which the screw-threaded end of the shank of the bolt(s) is screwed forms at the same time the cage for the rolling elements which is held in position on the external wall of the cylinder of the shock absorber. Preferably, the rolling elements are urged radially towards the inside in a groove formed in the external wall of the cylinder, and the cage, which is in a fixed position with respect to this groove, guides the rolling elements so that they co-operate with the plastically deformable member which, in this case also, is formed either by the body of the shock absorber itself or by a sleeve held in position against the internal wall of the body by at least the bolt(s).

It is known that in the case of shock or impact at high speed onto a shock absorber, the extrusion is no longer possible and the rod is locked in the body of the shock absorber. Consequently, according to the above-mentioned application, a threshold for triggering the device for absorbing energy by plastic deformation of the shock absorber is selected that is higher than the stress affecting the shock absorber in normal operating conditions but is lower than a stress which would damage the structure supported by the shock absorber in the case of locking of the rod in the cylinder of the latter.

The components according to the above-mentioned application have the advantage that the useful travel of their devices for absorbing energy by plastic deformation and/or for limiting stress is the same as that of their rod when these components fulfil their main function, while having the advantages of mounting in series. In comparison with analogous prior art components, the length of a component according to the invention is therefore not modified by the addition of the supplementary function of absorbing energy and/or limiting stress.

The present invention proposes, on the one hand, to modify skid landing gear and to provide them with components according to the above-mentioned application so that landing gear of this type has an "anti-crash" capacity and, on the other hand, to develop other components that are similar to those forming the subject of the above-mentioned application and are provided with an analogous device for absorbing energy by plastic deformation and/or for limiting stress and that are especially well adapted for the fittings of the skid landing gear according to the invention.

For this purpose, a skid landing gear according to the invention comprising two undercarriage parts which are fixed to the structure of the aerodyne and each of which has a skid connected to the said structure by two crosspieces is characterised in that each of the two crosspieces of each undercarriage part is hinged on the structure about an axis parallel to a hinge axis on the structure of the other crosspiece of the same undercarriage part and at least one component that has a main mechanical and/or hydraulic function, such as a strut, a cross-bracing and/or control jack, a shock absorber or a shock absorber jack, and is provided with a device for absorbing mechanical energy by plastic deformation and/or for limiting stress which is connected on the one hand to a crosspiece of the respective undercarriage part and on the other hand either to the corresponding skid or to the structure of the aerodyne.

In a manner known per se, especially from the above-mentioned application, the device for absorbing energy by plastic deformation and/or for limiting stress comprises rolling elements, such as balls, interposed with squeezing between two members that are to slide axially one inside the other after rupture of a breakable element having a predetermined breaking strength which, when whole immobilises the two members with respect to one another in an initial position so that the rolling elements cause a dissipation of energy by plastic deformation of at least one of the two members when the axial force applied to the device is greater than a threshold corresponding to the breaking strength of the breakable element.

According to a first embodiment according to the invention, the two crosspieces of each undercarriage part are, on the one hand, rigidly fixed by one of their ends to the corresponding skid and, on the other hand, hinged on the structure of the aerodyne about a common hinge axis which is located nearer the other undercarriage part than the skid of the particular undercarriage part, the component provided with a device for absorbing energy by plastic deformation and/or for limiting stress being hinged on the structure of the aerodyne by one of its ends and on one of the crosspieces by the other end and being stressed when the undercarriage parts separate one from the other by simultaneous pivoting movement of each of them about its hinge axis. In this embodiment, in which energy is absorbed by separation of the crosspieces of the undercarriage parts before these themselves and also, possibly, the other elements of the undercarriage parts, such as the skids and the hinges, deform plastically, if the energy at impact is much greater than that which the device can absorb, it is advantageous that, when the skid of each undercarriage part is mounted to one side under the structure of the aerodyne, as seems always to be the case, one of the crosspieces of each undercarriage part, which forms a front crosspiece, is hinged by its other end about the hinge axis while the other crosspiece which forms a rear crosspiece, is hinged, on the one hand, by its other end on the corresponding end of the component provided with a device for absorbing energy by plastic deformation and/or for limiting stress and, on the other hand, at a point situated between its two ends about the hinge axis so that the said component is stressed in tension when the undercarriage parts separate laterally one from the other.

In fact, in this case, the component provided with the device for absorbing energy is stressed under favourable conditions both in the case of vertical impact at a high vertical speed and in the case of a combined impact with both high horizontal and high vertical speed since it absorbs approximately two-thirds of the energy of impact sustained by the corresponding undercarriage part.

Furthermore, since this component works in tension, it is not necessary to design it so that it resists buckling, thus limiting its weight.

If, furthermore, the crosspieces are curved tubular elements the concavity of which is turned towards the underside of the structure of the aerodyne, and if the components provided with a device for absorbing energy are hinged by their lower ends on the corresponding end of the rear crosspiece of the undercarriages and by their upper ends to the structure of the aerodyne, landing gear is obtained having components provided with a device for absorbing energy that can be housed within the fuselage of the aerodyne, so that the aerodynamic drag of the latter is not increased and the components keep virtually the same positions, which has the advantage that the direction of the stress that they withstand remains approximately the same and the components retain their effectiveness throughout impact.

According to another embodiment, the two crosspieces of each undercarriage part are hinged on the corresponding skid about axes that are parallel to one another and to the hinge axes of the crosspieces on the structure of the aerodyne in such a manner as to form with the skid approximately a deformable parallelogram the cross-bracing stresses of which are taken up by each component provided with a device for absorbing energy and which is, itself, hinged about axes parallel to the hinge axes of the crosspieces.

In this case, energy is absorbed both by a separation of the crosspieces of one of the undercarriage parts with respect to those of the other undercarriage part and by deformation of the components provided with a device for absorbing energy, this deformation being linked to the rotation of the crosspieces about their hinge axes on the structure.

According to a first variant of this embodiment, on each undercarriage part, each component provided with a device for absorbing energy extends between the corresponding skid and one crosspiece, which has the advantage that the landing stresses remain internal to the landing gear and the only elements of the landing gear that require reinforcement to withstand the stresses of impact are the hinges (rotation pin and attachments). It should also be noted that this embodiment can be readily fitted to a helicopter already having skid landing gear.

Especially in the case of landing gear having the skid of each undercarriage part mounted to one side under the structure of the aerodyne and connected to the structure by a forward crosspiece and a rear crosspiece, the landing gear comprises, for each undercarriage part, a single component which is provided with a device for absorbing energy and is hinged by its lower end on the skid and by its upper end on the rear crosspiece. The increase in weight of landing gear of that type and the increase in the aerodynamic drag resulting from the presence of the component and the position which it occupies are slight. If the single component of each undercarriage part is, in this case, hinged on the skid at a point located between the hinges of the two corresponding crosspieces on this skid, which hinges are set back slightly with respect to the hinges of the crosspieces on the structure, this results, furthermore, in the component being stressed in compression. This component must be designed in such a manner that it withstands buckling, this disadvantage being compensated for by its shorter overall length, when positioned in this manner, compared with the length it would have if it were stressed in tension as a result of being hinged on the skid, for example, behind the hinge of the rear crosspiece of the skid.

According to a second variant of this embodiment, on each undercarriage part, each component provided with a device for absorbing energy is hinged between one crosspiece and the structure of the aerodyne, allowing this structure to take up the stresses introduced by the component, and if each component is hinged to a lever that is integral with the corresponding crosspiece, it is also possible to house the components within the fuselage of the aerodyne, which is advantageous with regard to aerodynamic drag.

In a special embodiment of landing gear having the skid of each undercarriage part mounted to one side under the structure of the aerodyne and connected to the latter by a front crosspiece and a rear crosspiece, the landing gear comprises, for each undercarriage part, a single component which is provided with a device for absorbing energy and is hinged on the lever which is integral with the rear crosspiece at a point located at the other side of the hinge of the rear crosspiece on the structure of the aerodyne than the hinge of the rear crosspiece on the skid, which offers the advantage of being able to position the component such that it remains approximately in the same position throughout impact and across the whole range of pivoting of the corresponding rear crosspiece, thus maintaining its effectiveness.

Finally, it is also possible to make this component work in tension.

In the different variants of this embodiment, it is advantageous that the hinge axes of the crosspieces and of the component(s) provided with a device for absorbing energy of one undercarriage part are parallel and, preferably, coaxial with the corresponding hinge axes of the other undercarriage part, permitting good balance in the distribution of stress, and the landing gear according to the invention has a simple structure if each of the crosspieces of an undercarriage part is integral with the corresponding crosspiece of the other undercarriage part being joined by a rectilinear section rotatably mounted in mountings on the structure of the aerodyne.

In particular, each of the two pairs of corresponding crosspieces of the two undercarriage parts may advantageously be formed by a long tubular element which is curved at its two ends and has its concavity turned towards the underside of the structure of the aerodyne.

The invention also relates to components intended especially for the fittings of landing gear having components provided with a device for absorbing energy that are hinged between the skids and the rear crosspieces.

Such a component, the main function of which is mechanical and/or hydraulic, such as a strut, a cross-bracing and/or control jack, a shock absorber or a shock absorber jack, and which comprises a tubular element inside which is housed a telescopic element that is immobilised with respect to the tubular element in at least one utilisation position by at least one locking device, as well as a device for absorbing energy by plastic deformation and/or for limiting stress comprising rolling elements interposed with squeezing between two members that are capable of sliding one inside the other after rupture of a breakable element having a predetermined breaking strength, so that the rolling elements bring about, by plastic deformation of at least one of the two members, at a predetermined plastic deformation load, a dissipation of energy, the breakable element which has a predetermined breaking strength being included in the locking device, such a component is characterised in that the telescopic element is integral with the plastically deformable internal member of the device for absorbing energy and the tubular element forms a plastically non-deformable external member of the device for absorbing energy.

In an embodiment that is advantageous owing to its simplicity of structure, the plastically deformable member is a sleeve which covers the outside of the telescopic element over at least a part of its length and with sufficient radial clearance to allow the plastic deformation, and the rolling elements are preferably separated one from the other by a cage which is integral with the tubular element.

In contrast, when equipping landing gear having components provided with a device for absorbing energy that are hinged between the crosspieces and the structure of the aerodyne, advantageously a component is used similar to the strut which is the subject of the above-mentioned application but which differs in that the bolt having the partially screw-threaded shank which immobilises the telescopic element in the tubular element is screwed into a radial internal screw thread traversing the tubular element not at its end traversed by the telescopic element but at the place opposite to the end of the telescopic element inside the tubular element, the plastically deformable member is formed by the tubular element and, in the initial position, the telescopic element is retracted to the maximum extent into the tubular element in order to allow maximum travel when the component thus formed is stressed in tension.

The present invention will be better understood with the aid of the special embodiments which are described below, in a non-limiting manner, with reference to the attached Figures.

FIG. 1 is a schematic view of a jack provided with a device for absorbing energy by plastic deformation and/or for limiting stress which is to be stressed in tension.

FIGS. 2 and 3 are views in partial cross-section of one end of the jack according to FIG. 1, before and after rupture of the breakable element, respectively.

FIG. 4 is a view analogous to FIG. 1 of a jack in which the device for absorbing energy by plastic deformation and/or for limiting stress is to be stressed in compression.

FIGS. 5 and 6 are views analogous to FIG. 2 and 3 for the jack according to FIG. 4.

FIG. 7 is a view in partial cross-section of a strut provided with a device for absorbing energy by plastic deformation and/or for limiting stress.

FIG. 8 is a longitudinal schematic view of a first example of skid landing gear.

FIG. 9 is a perspective view of the left undercarriage of the landing gear according to FIG. 8 (the right undercarriage being symmetrical) in the position which it adopts on a helicopter, only the attachments of the left undercarriage part thereof being shown, for the sake of clarity.

FIG. 10 is a cross-section of the component provided with a device for absorbing energy that is fitted to the undercarriage part according to FIG. 9.

FIGS. 11 and 12 are side views of the undercarriage part according to FIG. 9 before and after triggering of the device for absorbing energy, respectively.

FIGS. 13 to 17 are views analogous to FIGS. 8 to 12, respectively, for a second example of skid landing gear.

FIG. 18 is a schematic view in cross-section of a third example of skid landing gear mounted on a helicopter.

FIGS. 19 to 22 are views analogous to FIGS. 9 to 12, respectively, for this third example of skid landing gear.

With reference to FIGS. 1 to 3, the jack is formed by a cylinder 1 in which a rod 2 is slidably and sealingly mounted, which rod 2 is guided at the end 3 of the cylinder traversed by the rod 2 by a ring and at least one dynamic seal (not shown). The other end of the cylinder 1, which has a cylindrical portion 4 having a larger internal diameter, is closed by a hollow end-piece 5. At one end, this end-piece has a fastening means 6 and at its other end has an external thread on a cylindrical portion 7 by means of which the end-piece 5 is mounted about the end of the portion 4 of the cylinder 1 and is retained thereon by a threaded ring 8 retained on the cylinder 1 by an axial stop 9 located in a groove on the external face of the cylinder 1, a seal being interposed between the portion 7 of the end-piece 5 and the portion 4 of the cylinder 1. At its end outside the cylinder 1, the rod 2 is provided with a fastening means 10 and at its end inside the cylinder 1, which has a portion 11 having a smaller external diameter, is provided with a piston 12 which is fitted with dynamic seals 13, slides on the internal wall of the cylinder 1 and guides the rod 2 when it is displaced relative to the latter. On the portion 11 of the rod 2 having a smaller external diameter, there are arranged in succession, from the radial shoulder 14 towards the sealed and externally threaded end 15 delimiting the portion 11 of the rod 2, a radial internal projection 16 of the base of an arrangement of resilient catches 17 which are to catch in resilient manner behind a step provided in the end 3 of the cylinder 1 to ensure the locking of the hydraulic jack in the position "rod extended" (in a manner analogous to that described below for the locking in the position "rod retracted", as shown in FIG. 2), then the piston 12, a cage 18 for balls 19, a distance sleeve 20, an internal collar 21 of a radial internal projection of the base of an arrangement of resilient catches 23, and, finally, a retaining nut 24 screwed onto the thread of the sealed end 15. The internal collar 21 is separated from the external collar 22 of the internal radial projection by a section having a predetermined shear breaking strength which thus forms a breakable element referred to below by the term mechanical fuse. The cage 18 has a cylindrical portion 25 that has a smaller internal diameter and is radially disposed between the piston 12 and the portion 11 of the rod 2 and also a cylindrical portion 26 that has a larger internal diameter, has radial boreholes centred in a diametral plane each of which accommodates a ball 19, and surrounds a spring 27 itself arranged around the distance sleeve 20. The spring 27 rests at one of its ends against the radial portion of the cage 18 separating the two cylindrical portions 25 and 26 of the latter and at its other end against a ring 28. The ring 28, the external shape of which is cylindrical and which is slidably mounted about the distance sleeve 20, is provided with a tail 29 resting against the external collar 22 of the mechanical fuse and has on its external face a groove 30 which has a partially circular cross-section which is connected by a conical surface to an external cylindrical surface 31 of the ring 28 and is directed towards the face of the ring against which the spring 27 rests.

The rod 2 is locked in the cylinder 1 in the retracted position by the resilient catching of the heads of the catches 23 behind a step formed by the end of a sleeve 32 which extends into the cylinder 1, is arranged radially between an end portion of the portion 4 of the latter and the arrangement of catches 23 and is maintained in position by its radial external shoulder 33 which is squeezed between a radial shoulder of the end-piece 5 and the end of the portion 4 of the cylinder 1. The catches 23 are locked into this retracted position of the rod by a stop means which comprises a locking piston 34 that is slidably and sealingly mounted in a bore in the end-piece 5 by virtue of a seal 35, and is urged by a spring 36 resting against the closed end of the end-piece 5 towards the inside of the cylinder 1 so that it lodges inside the heads of the catches 23 in order to prevent the latter from disengaging from the end of the sleeve 32. The stop means is associated with a device for controlling the locking which comprises a dog 37, one end of which is pivotally mounted in a middle chamber 38 of the end-piece 5 and the other end of which is pressed against the head of one of the catches 23.

When locked, these catches displace the dog 37 which activates a contact 39. An inspection lamp placed on the instrument panel allows the aircrew to check the locking in the retracted rod position.

The pressurising of the chamber 38 of the end-piece 5 through an hydraulic oil feed connector 40 drives the piston 34 back towards the bottom of the said end-piece against the spring 36 and brings about, in succession, the release of the catches 23, an initial displacement of the rod 2 together with the released catches 23 in the cylinder 1 towards the extended rod position and the supply of pressurised oil to the chamber defined by the cylinder 1, the rod 2 and the piston 12, which causes the rod to extend, the rod being locked at the end of travel in the extended rod position by cooperation of the catches 17 with a stop means analogous to that just described but arranged in the end 3 of the cylinder 1 traversed by the rod 2 and in which, therefore, the locking piston is an annular piston.

The hydraulic jack which has just been described having mechanical locking and hydraulic release in the two positions at the end of travel is designed to interconnect via the fastening means 6 of its cylinder 1 and via the fastening means 10 of its rod 2, with two elements which, in certain circumstances, the jack is to displace relative one to the other and, in other circumstances, is to maintain in a fixed position one relative to the other, when it is in the rod retracted configuration, against a load stressing one of the two elements. When this load is a load causing stress in tension of the jack at a value greater than the maximum permissible stress that can be transmitted by the jack to one or other of the elements without risk of damage to one of the latter, it is clear that the jack should limit the force transmitted to a predetermined acceptable value and thus absorb or dissipate a certain amount of excess energy. This is obtained by calibrating the rupture section having a predetermined shearing strength which separates the two internal and external collars 21 and 22 of the breakable element to the maximum tensile stress that can be transmitted, which forms the value triggering the operation of the device for absorbing energy by plastic deformation provided on the jack.

If the tensile stress on the jack reaches the predetermined trigger value, the rupture section breaks and the internal collar 21 separates from the external collar 22 of the projection of the catches 23 which are maintained in position by the stop means. The rod 2 begins to move out of the cylinder 1 while the spring 27 extends maintaining the ring 28 in abutment by its tail 29 against the external collar 22. Since, however, the cage 18 is carried along with the rod 2 by means of the distance sleeve 20, the internal collar 21 and the nut 24, the portion 26 of the cage 18 is displaced axially relative to the ring 28 and causes the balls 19 to leave the groove 30 owing to the conical surface which connects the groove to the external cylindrical surface 31 of the ring 28, on which surface the balls come to rest. The device for ejecting the balls 19 thus formed allows the latter to protrude into the recess 41 delimited by the end portion 4, having the larger internal diameter, of the cylinder 1 after the rupture of the breakable element. Under the effect of the tension, the rod 2 is then displaced in the cylinder 1, carrying along the balls 19 which are positioned by the cage 18 so that they are pressed radially towards the interior on the cylindrical portion 31 of the ring 28. Since the balls 19 have a diameter that is greater, by a predetermined value, than the difference between the internal radius of the cylinder 1 in its middle portion having the smaller internal diameter and the radius of the cylindrical surface 31 of the ring 28, when they reach the end of the recess 41 they plastically deform the cylinder 1 of the jack over the remainder of the travel of the rod 2 in the cylinder 1, as shown in FIG. 3, which brings about an absorption and dissipation of energy, permitting the force transmitted by the jack to be limited to an acceptable value at least for as long as the deformation lasts.

The quantity of energy absorbed is determined especially by the size of the indentation of the balls 19, by their number and by the thickness of the cylinder 1, as well as by the relative hardnesses of the materials chosen for the manufacture of these elements. If the absorption of energy is to be constant, the deformation will be constant over the whole travel of the balls 19 if a cylinder having a constant cross-section and a constant thickness is used, but if a variable absorption is desired over the travel of the balls 19, the cylinder may be of a variable thickness adapted to the desired profile.

If the desired effects result in a construction of the cylinder 1 that is incompatible with its normal operation as the cylinder of a hydraulic jack having a particular volumetric displacement, taking into account the hydraulic pressure prevailing in the hydraulic supply circuit, adapted to the forces to be developed to control over a desired travel and to lock in position the two elements to which the jack is connected, then the cylinder 1 can be lined by an internal sleeve that is plastically deformable in the same conditions and shaped with sufficient radial clearance to allow the plastic deformation caused by the balls 19.

The jack that has just been described has the advantage that the travel of the balls 19 is virtually identical to that of the rod 2 in the cylinder 1 while having the advantages of mounting in series of a combined device fulfilling the functions of a jack and of a device for absorbing energy and/or for limiting stress. The length of the jack is not, therefore, altered by the addition to its main function of a supplementary function of absorbing energy and/or limiting stress.

Furthermore, it should be noted that a calibrated membrane or a pressure relief valve 42 is disposed in the end 3 of the cylinder 1 traversed by the rod 2, in such a manner as to allow the venting towards the exterior of the jack of the annular chamber, defined between the cylinder 1 and the rod 2 by the piston 12 and the end 3 of the cylinder 1, such that the oil filling this chamber does not oppose the displacement of the piston 12 together with the rod 2 in the cylinder 1 after rupture of the breakable element and during displacement of the balls 19 that plastically deform the cylinder 1.

FIGS. 4 to 6 show a jack provided with a device for absorbing energy and/or for limiting stress which is to be stressed in compression, starting from the rod extended position, by a force greater than the maximum permissible value.

The elements of this jack that are identical to those in the jack described with reference to FIGS. 1 to 3 are identified by the same reference numerals.

It should be noted especially that the rod 2 is identical but that the group of elements that it supports on its end-portion 11 having a smaller external diameter is arranged in the opposite direction so that the catches 23, provided at their base with a radial projection forming the breakable element by its internal and external collars 21 and 22, respectively, can be locked by a stop means housed in the end-piece 53 at the end of the cylinder 51 traversed by the rod 2. It is therefore the internal collar 21 that is squeezed between the shoulder 14 of the rod 2 and the distance sleeve 20, while the radial internal projection 16 of the catches 17 is squeezed between the piston 12 and the nut 24, the cage 18, the balls 19, the ring 28 and the spring 27 occupying the same relative positions as before with regard to the piston 12 and the internal collar 21 and the whole forming a system for ejecting the balls 19 so that they protrude into the recess delimited by the portion 54, having the larger internal diameter, of the cylinder 51 after rupture of the breakable element.

The stop means housed in the end-piece 53 comprises an annular locking piston 84 which is slidably and sealingly mounted inside a bore in the end-piece 53 by virtue of the seal 85 and around the rod 2 by virtue of the seals 87 and is stressed by a spring 86 so that the axial extension 89 of the piston 84 locks the catches 23 behind the step of the sleeve 32, the radial projection 33 of which is squeezed against the end of the portion 54 of the cylinder 51 by the end-piece 53. The end-piece 53 has a middle chamber 38 in which there is pivotally mounted the dog 37 which presses on the contact 39 when the catches 23 are locked and also a hydraulic oil feed connector 90 to control the hydraulic release and the operation of the jack.

The operation of this jack is analogous in all points to that of the jack described with reference to FIGS. 1 to 3 apart from the fact that the device for absorbing energy and/or limiting stress is triggered by a compressive force that is greater than the predetermined shear breaking strength of the section separating the external collar 22 and the internal collar 21 of the breakable element and is exerted on the jack when locked in the extended rod configuration. Consequently, the calibrated membrane or the pressure relief valve symbolised by 42 is provided on the end-piece 55 of the end of the cylinder 51 that is not traversed by the rod 2 to allow the evacuation of the cylinder 51 during retraction of the rod 2 after rupture of the breakable element.

The strut shown in FIG. 7 is formed by a body 151 of cylindrical shape, one end of which is closed by an end-piece 152 screwed into the body 151 and provided with a device for mechanical connection, such as a trunnion 153, and the other end of which is traversed by a rod 154. This rod 154, the end of which outside the cylinder 151 has an end-piece which is provided with a trunnion 156 and is screwed into the rod 154 in an adjustable manner for adjusting the length of the strut to a desired dimension by means of its threaded portion 157, has, inside the cylinder 151, a cylindrical portion 158 which has a smaller internal diameter, is externally threaded and is extended by a conical end-portion 159. There are supported on this end-portion balls 160 retained in a tubular cage 161 which is screwed onto the thread on the cylindrical portion 158 of the rod 154 and slides inside a plastically deformable sleeve 162 which is bulged approximately at its centre around the portion of the balls 160 protruding beyond the cage 161 and lines the inside of the body 151 with sufficient radial clearance to allow its plastic deformation, with absorption and dissipation of energy, when the balls 160 are displaced together with the rod 154 by means of the cage 161 in one or other direction in the body 151. To facilitate control during displacement in the direction of extension or retraction of the rod, the cage 161 has a cylindrical end-portion 163 or 164, respectively, which slides inside the sleeve 162 before it is deformed. The sleeve 162 is maintained in an axial position in the cylinder 151 by bolts 165 having partially threaded shanks that are screwed into radial bore-holes in the cylinder 151 at its end adjacent the end-piece 152 and by bolts 166 having partially threaded shanks which are screwed into radial bore-holes in the cylinder 151 at its end traversed by the rod 154, the non-threaded portions of the shanks of the bolts 165 and 166 passing through bore-holes made in the facing ends of the sleeve. In addition, the non-threaded portions of the shank of the bolts 166 have a breakable section having a predetermined shear breaking strength such that it forms a mechanical fuse. The ends of these shanks penetrate radial bore-holes in the rod 154 so that the bolts 166 ensure axial locking, in an initial position, of the rod 154 in the cylinder 151.

The strut is therefore formed by a rod 154 locked in a semi-extended position in the cylinder 151 by mechanical fuses which rupture at a predetermined value for the stress in compression or tension exerted on the strut and corresponding to the value for triggering the device for absorbing energy and/or limiting stress by plastic deformation of the sleeve 162 by the balls 160.

It is clear that in this configuration the travel of the device for absorbing energy is limited approximately to half the length of the body 151.

If, however, the device for absorbing energy of the strut is intended to be stressed only in compression or in tension, the rod 154 may be locked in an initial position of rod extended or rod retracted, respectively, by the bolts 166, so that virtually the complete length of the cylinder 151 can be used as the travel of the device for absorbing energy. Naturally, the sleeve 162 is bulged around the balls 160 at its corresponding end.

If desired, it is also possible to dispense with the sleeve 162, which sleeve has the advantage that it can be replaced after deformation, and to manufacture the strut so that the balls 160 plastically deform the cylinder 151.

The jack and the strut that have just been described with reference to FIGS. 1 to 7 are especially suitable for fitting to the landing gear of aerodynes, especially helicopters, to which these components impart an "anti-crash" capacity.

The left-hand undercarriage part of a skid landing gear for helicopters shown in FIGS. 8 and 9 comprises a skid 170 which is formed by a tubular element having raised ends (the front end being raised to a greater degree than the rear end) and on which there are welded or bolted a front pair of fastening lugs 171 and a rear pair of fastening lugs 172 the lower parts of which are moulded to the shape of the tubular element 170 and the upper parts of which are vertical and parallel for each pair so that they form two fork joints in which there are pivotally mounted about transverse pins 173 and 174, perpendicular to the longitudinal plane of symmetry of the helicopter, the lower ends of a front crosspiece 175 and a rear crosspiece 176. Each of the crosspieces 175 and 176 is formed in one piece with the front crosspiece and the rear crosspiece, respectively, of the right-hand undercarriage part and each pair of crosspieces thus obtained is formed by a tubular element having ends that have been curved in the same direction and in an identical manner with a straight centre section 177 and 178 between them.

The front pair of crosspieces, such as 175, and the rear pair of crosspieces, such as 176, is each pivotally mounted on the structure of the helicopter about a transverse axis that is perpendicular to the longitudinal plane of symmetry using the corresponding straight central section 177 or 178 which is rotatably mounted in mountings 179 and 180 which at the same time form bearings for rotation of the elements 177 and 178 and structural fastenings for connecting the undercarriage parts to the structure of the helicopter.

The crosspieces 175 and 176 are therefore hinged on the one hand on the skid 170 and on the other hand on the structure of the helicopter in the manner of a parallelogram that is deformable in the longitudinal direction, since the skid 170 extends in that direction, laterally and below the cabin of the helicopter. The undercarriage part is locked in an initial utilisation position by a component 181 having a main mechanical function of ensuring the bracing of the undercarriage part which is pivotally mounted adjacent its upper end on the rear crosspiece 176 about a transverse axis, that is to say parallel to the pins 173 and 174, and at its lower end about a pin 182, likewise parallel to the pins 173, 174, in a fork joint formed by two fastening lugs 183 like the front lugs 171 and the rear lugs 172 and welded or bolted to the tubular skid 170 as they are and between them.

The length of the component 181 and the position of its hinge points on the skid 170 and on the rear crosspiece 176 are selected, taking into account the nature of this component, so that in an initial position for use the front and rear crosspieces 175 and 176 are slightly inclined from top to bottom towards the rear, as is shown in FIGS. 8 and 11, that is to say the hinge pins 173 and 174 on the skid 170 are slightly set back with respect to the hinge mountings 179 and 180 on the structure.

The component 181 is the component that provides the bracing of the parallelogram and is provided with a device for absorbing energy by plastic deformation and/or for limiting stress of the type described above which operates by deforming a tube by its balls. This component is rigid for impacts occurring following a rate of fall that is lower than a given threshold which corresponds to the threshold triggering the device for absorbing energy, that is to say lower than the breaking strength of its breakable element, and for speeds greater than this threshold this component limits the accelerations to which the structure of the helicopter is subjected by transmitting only a limited force.

This component 181 therefore operates as a device having high energy absorption whenever the impact speed is greater than the threshold.

In the case of a normal landing, that is to say at an impact speed that is lower than the threshold triggering the device for absorbing energy, for example 2 m/s, the total energy is absorbed substantially by the elastic deformation of the front crosspiece 175 and the rear crosspiece 176 so that the two undercarriage parts separate laterally one from the other and then resiliently resume their positions. This elastic deformation is facilitated by the shape of the curved crosspieces the concavity of which is turned towards the underside of the helicopter cabin. By contrast, when a landing is at an impact speed that is too great, thus triggering the operation of the device for absorbing energy by stressing the component 181 in compression, the energy is absorbed, on the one hand, by lateral separation of the undercarriage parts and, on the other hand, by the plastic deformation of the member provided for this purpose in the component 181 following the rotation of the crosspieces 175 and 176 towards the rear about the hinge mountings 179 and 180 on the structure and the corresponding deformation of the parallelogram.

The component 181 is, for example, a strut, such as that shown in FIG. 7, the initial position of which corresponds to a position in which the rod is extended from the body to the maximum in order to give maximum travel for absorption of energy by plastic deformation in the case of stress in compression that is greater than the trigger threshold.

The component 181 may, however, be a cross-bracing jack, or even a control jack, if it is desired to be able to raise the undercarriage parts with respect to the helicopter cabin during flight in order to reduce drag, and this jack may be of the type shown in FIGS. 4 to 6 in which the device for absorbing energy operates in compression.

Finally, the component may be a shock absorber or a shock absorber jack provided with a device for absorbing energy. Such solutions are, however, expensive and disadvantageous on account of their weight.

For these reasons, it is preferable to use the component 181 shown in cross-section in FIG. 10 which is a strut the tubular element or body 184 of which is pivotally mounted at its lower end by a spherical section 185 in a part-spherical cradle 186 which is pivotally mounted about the head 187 of a spindle 188 which is, for its part, pivotally mounted about a transverse pin in a bush 189 which passes through the rear crosspiece 179. The tubular element or rod 190 of the strut is threaded at its lower end so that it can be screwed onto a base 191 itself pierced by a central threaded bore-hole into which there is screwed the screw-threaded shank of an adjustable end-piece 192 which is held in the desired axial position on the base 191 by a lock nut 193 and carries a tubular fastening means 194 pivoted on the fastening lugs 182 of the skid 170 as a trunnion by a bolt 195, the smooth portion of the shank thereof passing through the tubular fastening means 194 and the screw-threaded end of the shank thereof being screwed into a nut 196 retained by a pin.

The device for absorbing energy by plastic deformation and for limiting stress comprises an external plastically non-deformable member which is formed by the body 184 of the strut the portion 185 of which in the form of a truncated sphere has recesses in the form of spherical caps regularly distributed over the periphery of its central cylindrical bore-hole in such a manner that it forms a cage for the balls 197, and the internal plastically deformable member is formed by a tubular sleeve 198 which covers the outside of the rod 190 of the strut with sufficient radial clearance to allow plastic deformation. The lower end of the sleeve 198 rests against an external radial shoulder of the base 191 while its upper end is radially narrowed so that it can be housed between the rod 190 and the balls 197 in an initial position in which the rod 190 and the body 184 are interconnected one with the other by means of the breakable element having a predetermined breaking strength, i.e. a bolt 199, the threaded end of the shank of which is screwed into a radial bore-hole in the rod 190 and is separated from the smooth portion of the shank adjacent to the head of the bolt by a portion having a reduced cross-section forming the portion that is sheared when the axial compressive load exceeds a predetermined threshold. The upper end of the strut is closed by a plug 200 which is fitted into the rod 190.

FIGS. 11 and 12 show the positions of the different elements of an undercarriage part during normal landing, or before the device for absorbing energy is triggered (FIG. 11), and after the device has been triggered, respectively, virtually the complete lengths of the rod 190 and the deformable sleeve 198 having passed through the body 184 of the strut and the balls 197 having deformed the sleeve 198 over virtually its complete length (FIG. 12).

If the bracing stresses require unduly large dimensions or the use of materials incompatible with the correct operation of the strut, it is possible to arrange that the rod 190 is deformed by the balls; the sleeve 198 may then be dispensed with, resulting in a reduction in weight which is always useful.

The second example of a skid landing gear, which is shown in FIGS. 13 and 14, is analogous to the first example in as much as it is also a landing gear having each of its undercarriage parts mounted in the form of a laterally deformable parallelogram underneath the helicopter cabin. The many elements of this second example that are identical to those of the first example are identified by the same reference numerals. The essential difference lies in the fact that the bracing is, in this case, brought about by a component 201 which is pivotally mounted at its upper end on a structural mounting 202 about a transverse pin and at its lower end about a transverse pin 203 on the upper end of a lever 204 that is integral at its lower end with the section 178 of the rear crosspiece 176. The component 201, which has a substantially mechanical function to provide the bracing forces, can thus be housed within the structure itself of the helicopter. This component 201 is provided with a device for absorbing energy by plastic deformation and/or for limiting stress which is applied in tension in this example so that there is no need to provide the device with such dimensions that it resists buckling, so that the device is not unnecessarily heavy.

In this case, the energy is absorbed in the same conditions as for the first example, that is to say during normal landing by lateral separation of the undercarriage parts one relative to the other followed by a return to the initial position owing to the resilience of the crosspieces 175 and 176, and in the case of an abnormal landing by separation of the undercarriage parts and simultaneous rotation of the crosspieces 175 and 176 towards the rear following the triggering of the device for absorbing energy by plastic deformation of the component 201. The latter is, for example, a strut of the type shown in FIG. 7 but having the rod retracted into the body to the maximum degree in the initial position in order to allow maximum travel in tension, or a cross-bracing and, possibly, control jack, such as shown in FIGS. 1 to 3, in which the device for absorbing energy operates in tension, or alternatively a shock absorber or a shock absorber jack.

For reasons of cost, weight and simplicity, however, there is preferably used as the component 201 the strut shown partly in cross-section in FIG. 15. Its body is formed by a plastically deformable tube 205 fixed at its lower end to a base 206 having a central bore-hole for guiding the rod 207 and fixed at its upper end, which is radially widened, to a rigid end-piece 208 by means of a bolt 211, the smooth part of the shank of which passes through two aligned radial bore-holes in the tube 205 and in the end-piece 208 and is separated from the threaded end which is screwed into a cage 209 retaining the balls 210 and into upper end of the rod 207 by a narrowed section having a predetermined shear breaking strength. The end-piece 208 is provided with a tubular fastening means (not shown) for connection to the structural mounting 202 by a transverse trunnion pin. There is screwed into the lower end of the rod 207 the threaded shank of an end-piece 212 which is locked in the desired axial position by a lock nut 213 and which has a tubular fastening means 214 by means of which the rod 207 is pivotally mounted in a fork in the upper end of the lever 204 by the trunnion pin 203.

In this example, the plastically deformable member is the body 205 of the strut, and the rod 207 of the latter carries the cage 209 and carries along the balls 210 which plastically deform the tube 205 when the tensile stress exceeds the trigger threshold fixed by the predetermined shear strength of the shank of the bolt 211.

The positions adopted by the different elements of this landing gear in the case of normal landing or before the device for absorbing energy of the component 201 has been triggered are shown in FIG. 16 and the positions adopted after operation of the "anti-crash" device are shown in FIG. 17.

If the two embodiments of landing gear described above, which operate according to the same principle, are compared it is clear that the component 181 of the first example, hinged on the rear crosspiece 176, changes direction together with the crosspiece 176 so that the direction of the stress which stresses the component varies during the sequence of operation of the device for absorbing energy. In the second example, the direction of the component 201 is only slightly modified and the component preserves all its effectiveness while it operates. The first example of landing gear has the advantage, however, that such an embodiment can be readily fitted to a helicopter already equipped with skid landing gear. To withstand the stresses of an abnormal landing, only the hinges (pins and fastening lugs or mountings) must be reinforced since the stresses remain distributed inside the landing gear. In contrast, in the second example, these stresses are transmitted to the structure of the helicopter which must therefore be designed and constructed so that it withstands these stresses. Structural reinforcements must therefore be made. Furthermore, in the design of the helicopter, a free space must be provided for housing components 201. On the other hand, this second solution does not increase the aerodynamic drag of the landing gear.

The third embodiment, shown in FIGS. 18 and 19, operates according to a different principle. The front crosspieces 215 and the rear crosspieces 216 are curved tubular elements, the rear crosspieces 216 being longer than the front crosspieces 215. On each undercarriage part, the two crosspieces are rigidly fixed at their lower end to front lugs 217 and rear lugs 218 that are welded or bolted to the tubular skid 170. On the left-hand undercarriage part shown in FIG. 19, the front crosspiece 215 is pivotally mounted at its upper end about a hinge axis A on a structural mounting 219, while the rear crosspiece 216 is also pivotally mounted about the hinge axis A on a structural mounting 220, but at a point that is at a distance from its upper end by which the rear crosspiece 216 is pivotally attached by a pin parallel to the hinge axis A to the lower end of a component 221, which, for its part, is pivotally mounted at its upper end by a pin parallel to the hinge axis A on a different structural mounting 222.

The undercarriage part thus formed is therefore mounted so that it can bring about a simultaneous pivoting movement about the hinge axis A, and its bracing is provided by the component 221 having an essentially mechanical function and which is housed in the fuselage of the helicopter.

The component 221 with which each of the two undercarriage parts is provided is very similar to the component 201 of the second example of landing gear described above because, like the second example, it is stressed in tension.

This component 221 may therefore be a strut according to FIG. 7 or a jack according to FIGS. 1 to 3, or alternatively a shock absorber or a shock absorber jack, or preferably a strut such as the one shown in cross-section in FIG. 20, the structure and mode of operation of which is very similar to the structure and mode of operation of the strut shown in FIG. 15, the same reference numerals being used to identify the same elements, so that it is not necessary to describe again the operation of the device for absorbing energy by plastic deformation with which this component 221 is provided.

In this embodiment, the energy is absorbed solely by separation of the undercarriage parts one from the other by their simultaneous pivoting movement about the hinge axes, such as A. In the case of a normal landing, this separation is followed by a return to the initial position by the resilient restoration of the crosspieces having a concavity turned towards the underside of the fuselage of the helicopter, while in the case of an abnormal landing, the anti-crash device is triggered, as is shown in FIGS. 21 and 22, respectively. In this third example, only the component 221 and the rear crosspiece 216 participate in the absorption of energy in practice, and the component 221 has favourable conditions for its operation.

Finally, this third example has approximately the same advantages and the same disadvantages as the second example described above with regard to the space required in the fuselage for housing these components 221, the structural reinforcements required for their fixing and the absence of additional aerodynamic drag of the landing gear.

We claim:

1. Skid landing gear to be fitted to a helicopter comprising
a pair of crosspieces pivotally mountable to an undercarriage of a helicopter, each crosspiece including a straight central section and a pair of depending leg sections each having a lower end, each crosspiece being pivotable about a first axis perpendicular to a longitudinal axis of the helicopter,
a pair of parallel skids, each being on one side of the helicopter,
means for pivotally attaching said skids to the lower ends of the depending leg sections, each means for pivotally attaching having a pivoting axis parallel to said first axis,
each said depending leg section being inclined relative to vertical having its lower end more rearwardly of the helicopter than its straight central section,
means for absorbing and dissipating energy when acted upon by a force greater than a threshold value by plastic deformation of a component thereof, and
means for pivotally interconnecting said means for absorbing and dissipating energy to at least one of said skids and at least one of said depending leg sections, each means for pivotally interconnecting having pivoting axes parallel to said first axis,
whereby force exerting on the skid landing gear less than said threshold value is taken up by elastic flexion of said depending leg sections and force exerted on the skid landing gear greater than said threshold value is taken up by said means for absorbing and dissipating energy as the skid landing gear rotates and collapses rearwardly.

2. The skid landing gear as claimed in claim 1, wherein said means for absorbing and dissipating energy includes shock absorber means for pneumatically absorbing and damping energy when acted upon by a force less than said threshold value.

3. The skid landing gear as claimed in claim 1, wherein said means for absorbing and dissipating energy includes a cylinder, a rod telescopically mounted in said cylinder, means for moving said rod relative to said cylinder, and means for locking said rod relative to said cylinder in at least one utilization position.

4. Skid landing gear to be fitted to a helicopter comprising
a pair of crosspieces pivotally mountable to an undercarriage of a helicopter, each crosspiece including a straight central section and a pair of depending leg sections each having a lower end, each crosspiece being pivotable about a first axis perpendicular to a longitudinal axis of the helicopter,
a pair of parallel skids, each being on one side of the helicopter,
means for pivotally attaching said skids to the lower ends of the depending leg sections, each means having a pivoting axis parallel to said first axis perpendicular to the longitudinal axis of the helicopter,
each said depending leg section being inclined relative to vertical having its lower end more rearwardly of the helicopter than its straight central section,
a lever integral at a lower end thereof with said straight central section of one of said crosspieces,
means for absorbing and dissipating energy when acted upon by a force greater than a threshold value by plastic deformation of a component thereof, and
means for pivotally interconnecting said means for absorbing and dissipating energy to the other end of said lever and to a structural member in the helicopter, said means for pivotally interconnecting having pivoting axes parallel to said first axis,
whereby force exerted on the skid landing gear less than said threshold value is taken up by elastic flexion of said depending leg sections and force exerted on the skid landing gear greater than said threshold value is taken up by said means for absorbing and dissipating energy as the skid landing gear rotates and collapses rearwardly.

5. The skid landing gear as claimed in claim 4, wherein said means for absorbing and dissipating energy includes shock absorber means for pneumatically absorbing and damping energy when acted upon by a force less than said threshold value.

6. The skid landing gear as claimed in claim 4, wherein said means for absorbing and dissipating energy includes a cylinder, a rod telescopically mounted in said cylinder, means for moving said rod relative to said cylinder, and means for locking said rod relative to said cylinder in at least one utilization position.

7. Skid landing gear to be fitted to a helicopter comprising
- a pair of front crosspieces, each mountable to an undercarriage on one side of a helicopter to pivot about an axis substantially parallel to a longitudinal axis of the helicopter, each said front crosspiece having a lower end,
- a pair of rear crosspieces, each mountable to the undercarriage on one side of the helicopter to pivot about said axis on its respective side, each said rear crosspiece having a lower end and an upper end, said upper end extending past said axis into a body of the helicopter,
- a pair of parallel skids, each being on one side of the helicopter and being fixed to one front and one rear crosspiece,
- means for absorbing and dissipating energy when acted upon by a force greater than a threshold value by plastic deformation of a component thereof, and
- means for pivotally interconnecting said means for absorbing and dissipating energy to said upper ends of said rear crosspieces and to a structural member in the helicopter, said means for pivotally interconnecting having pivoting axes parallel to said axis,
- whereby force exerted on the skid landing gear less than said threshold value is taken up by elastic flexion of said front and rear crosspieces and force exerted on the skid landing gear greater than said threshold value is taken up by said means for absorbing and dissipating energy as the skid landing gear rotates and collapses laterally outwardly of the helicopter.

8. The skid landing gear as claimed as claimed in claim 7, wherein said means for absorbing and dissipating energy includes shock absorber means for pneumatically absorbing and damping energy when acted upon by a force less than said threshold value.

* * * * *